May 27, 1958     F. R. OFNER     2,835,984
SEPARATION AND RECOVERY OF SOLIDS AND
LIQUID FROM FLOUR MILL WASTES
Filed Sept. 28, 1953
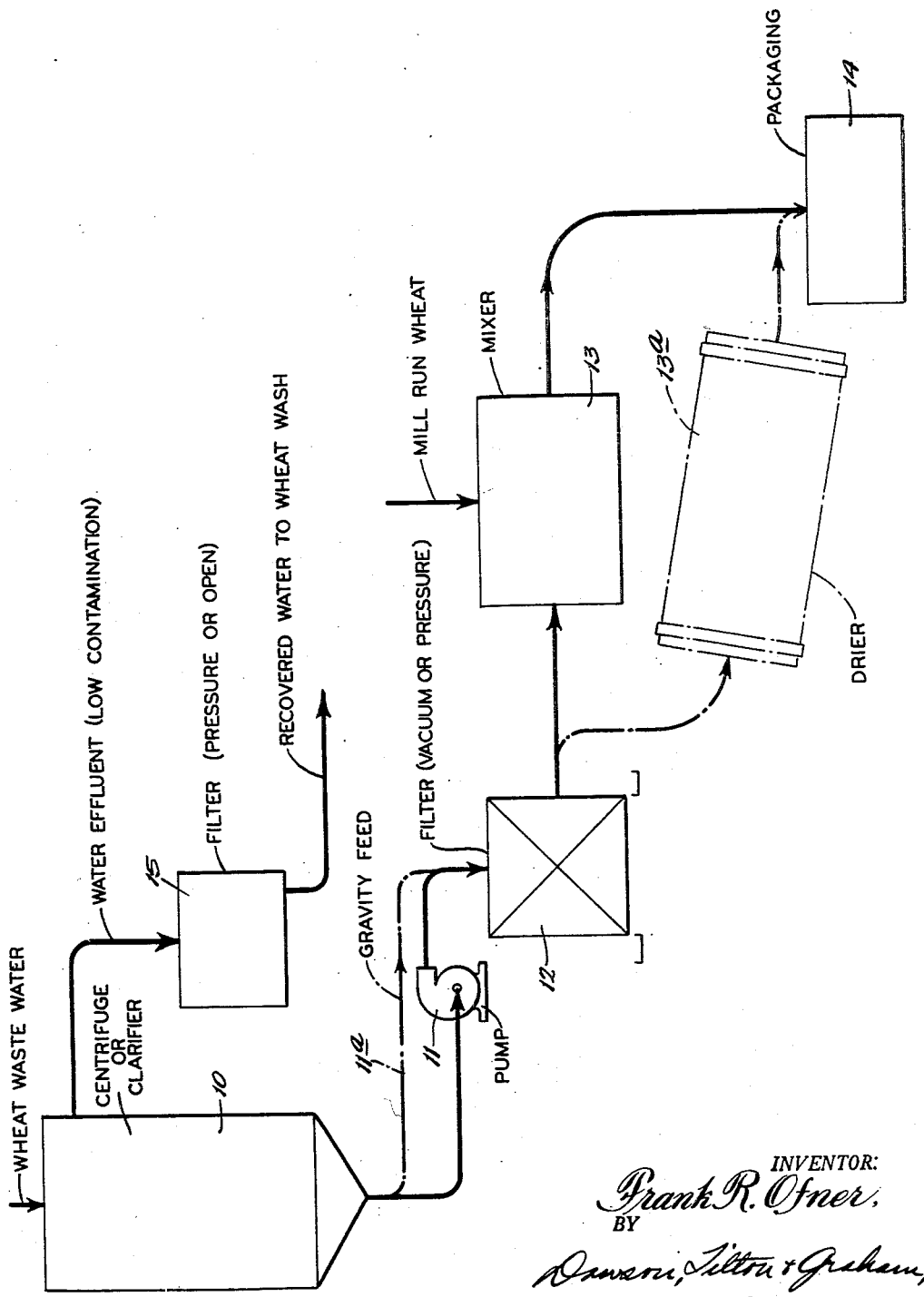
INVENTOR:
Frank R. Ofner,
BY
Dawson, Tilton & Graham,
ATTORNEYS.

United States Patent Office 2,835,984
Patented May 27, 1958

2,835,984

SEPARATION AND RECOVERY OF SOLIDS AND LIQUID FROM FLOUR MILL WASTES

Frank R. Ofner, Spokane, Wash., assignor to Industrial Processes, Incorporated, Spokane, Wash., a corporation of Washington Application September 28, 1953, Serial No. 382,806

5 Claims. (Cl. 34—12)

This invention relates to the separation of flour mill wastes from flour mill wash water, and more particularly to a process for both the recovery of a solids nutrient from wash water wastes of flour mills and the recovery of the wash water after a partial separation of the solids therefrom.

This application is a continuation-in-part of my co-pending application, Serial No. 325,773 filed December 13, 1952, and entitled Recovery of Flour Mill Wastes.

In a large percentage of flour mills the wheat used in preparing flour is cleaned prior to milling it into flour, by a washing process. In the process of washing, the wheat is subjected to a water bath, and, inadvertently, a large quantity of broken, cracked, and whole wheat is carried away with the waste wash water. Since a minimum amount of water is used in the washing process as an economy measure, a relatively large concentration of wheat solids is present in the waste wash water.

Generally the washing of the wheat grain takes place prior to the grains' being hulled and the whole grain with the hulls thereon is dumped into a water stream and carried thereby into a centrifugal separator that ordinarily consists of a rotating hollow cylinder having a plurality of apertures along the outer surface through which the broken and cracked grain as well as some of the hulls are carried. The grain products that will later be hulled and milled into flour are carried onwardly by the water stream through the center of the rotating cylinder. The wastes that are forced through the apertures in the rotating tank have at this point a paste-like consistency with a water content of about 60% to 75%.

These wastes have heretofore been disposed of as valueless and have been carried away from the centrifugal separator, after being discharged therefrom, by a stream of water that usually empties into a waste disposal system. The wastes are, however, high in food value since, excluding the actual wheat seed itself, they include the wheat heart which contains about 22% protein and 8% fat, and the hulls which are about 12% protein and 3½% fat.

Because of the food value in these flour mill wastes, prior attempts have been made to recover these products as an animal nutrient or feed. The attempts have been fruitless because the recovery could not be accomplished economically and, while the wastes are high in protein and fat, the recovered products had a very low protein and fat content and therefore had little utility as a nutrient.

It is only economically feasible to carry the flour mill wastes from the centrifugal separator by means of a water stream. Thus the wastes to be recovered must be separated from a rather large amount of water and the water separation can occur practically only in a thickener such as a centrifuge or clarifier or settling tank of some type. However, wheat is rich in both starch and gluten, and the gluten as is well known is a proteid or sticky albumin. Upon sitting for prolonged periods the proteids or proteins and starches are dissipated from the wheat by what is believed to be a leaching action and appear in the water as a thick gelatin or pasty mass. When this occurs and the wastes are introduced into a clarifier, the thick paste or gelatin clogs the filters and pumps and generally impedes the settling action of the clarifier. It is therefore virtually impossible to separate the fluids from the solids in the clarifier and certainly any separation that occurs is not efficient and therefore not economical. Further, since the fats and proteins have been dissipated from the wheat solids, the recovered products are therefore of practically no value as a nutrient and are not advantageously usable as an animal feed. I have discovered a practical process for recovering flour mill wastes wherein a valuable feed is obtained economically.

Further, since water is used in large quantities in the washing process, water costs are quite high and anything to conserve water is desirable if the cost of the conservation procedure is not greater than the water cost savings that will result. When the mill wastes are separated from the grain products in the washing operation, the water content of the wastes is about 60% to 75%. I have discovered that in the wastes recovery process the water may be recovered economically, and I provide an inexpensive process for its recovery.

An object of the invention is to recover a nutrient from flour mill wastes that is valuable as a feed. Another object of the invention is to provide an economically practicable process for treating flour mill waste water to recover a dry feed therefrom having a relatively high fat and protein content and an attractively low ash content. Still another object is in providing a process for recovering the waste water at the time the mill wastes are recovered. A further object of the invention is to provide a process for recovering a valuable dry nutrient from wheat wash water wastes of flour mills and recovering the water itself and that involves only a minimum capital expenditure for recovery equipment. Still a further object of the invention is to utilize a thickener in a process for recovering flour mill wastes and wherein the process is such that the formation of paste-like or gelatin-like masses is obviated so that clogging of the filters and pumps, etc., of the equipment used is avoided. Other objects and advantages will appear as the specification proceeds.

The drawing is a flow sheet illustrating in general the equipment used in the steps of the process and wherein, for the sake of clarity, alternative structure is illustrated in dotted lines.

The starting material is wheat wash water comprising essentially water and wheat solids including cracked, broken, and whole wheat. This starting material is flour mill wastes and is normally disposed of as valueless though it contains a relatively high concentration of wheat solids. For example, in even very small flour mills using water for the washing of the wheat grain the waste solids amount to about a ton per day.

I have discovered that if the recovery of the flour mill wastes is started within about 16 hours and up to 24 hours from the time of formation of the wastes, the dissipation of the proteins and fats of the wheat into the waste water is not sufficient to render the recovered material valueless as an animal nutrient. I have also discovered that if the recovery process is started within about this time the formation of a paste-like mass within the wastes has not progressed to such an extent that it is almost impossible to utilize a clarifier or centrifuge, etc., in thickening the flour mill wastes as a step in the recovery thereof. Therefore, within about 16 hours from the time the wheat wash water wastes are formed, I utilize a means for thickening the wastes. The thickening may be accomplished by introducing the wastes into a centrifuge, clarifier, settling tank, or some other thickener that has been designated with the numeral 10 in the drawing.

The wastes are processed in the thickener 10 until they have thickened to the desired consistency. If a clarifier is used the wastes are retained in the clarifier for about 10 to 30 minutes and it is found that the thickening or concentration of the solids will reach a proper consistency in about this range of time. The thickened material is pumped through a sludge pump 11 to a filter 12. The filter 12 is operative to further reduce the water content of the solids, and any suitable apparatus for accomplishing this result may be used. For example, the filter 12 may be a vacuum type filter or a pressure filter or, if desired, any one of a number of extrusion type presses may be employed and will perform the same operation of further reducing the moisture content of the wastes. Generally the vacuum type filter is more efficient than extrusion type presses and will be used for this reason.

Any type of pump 11 may be used to transfer the thickened solids from the thickener 10 to the filter 12. In certain installations it may be desirable to eliminate the pump 11 completely and to depend upon a gravity feed for transferring or flowing the thickened solids from the thickener 10 to the filter 12. A gravity type feed is illustrated in the drawing as an alternative structure and is therefore shown in dotted lines. The numeral 11a has been applied to the gravity feed for purposes of accurate identification.

In the event that the flour mill wastes are permitted to stand for a considerable period of time prior to being fed into the thickener 10, then it will be advantageous to remove the thickened solids from the thickener 10 immediately after the thickening thereof and to introduce the solids into the filter 12. If, on the other hand, the flour mill wastes are immediately introduced into the thickener 10 upon their formation, the wastes may be allowed to stand in the thickener for a substantial period without danger of excessive protein and fat dissipation and before excessive formation of the undesirable gelatinous or paste-like masses occurs.

In the filter 12 the moisture content of the thickened wastes is further reduced to about 65% (which is fairly dry to the touch). The excess water is drawn off from the filter and the relatively dry products are then transferred to a mixer 13. At the same time, a dry material is fed into the mixer 13 and is there mixed with the partially dry waste solids. In the mixer 13 the moisture content of the waste solids is reduced from about 65% to a value normally within the range of about 12 to 18%. Any desired dry products may be introduced into the mixer 13 and preferably mill run wheat is added to the mixer and is therewith mixed with the waste solids. It should be understood, however, that other dry material such as other feeds or grains, etc., may be used and mixed with the waste solids in the mixer 13.

Alternatively, a drier designated with the numeral 13a may be employed to dry the solids after they have been taken from the filter 12. A drier is indicated in the drawing by dotted lines in parallel relation with the mixer 13. Any type of drier 13a may be employed and I have found that a rotary type kiln is satisfactory. In the drier the moisture content of the waste solids is reduced from about 65% to within the range of about 10 to 18%.

From the mixer 13 or drier 13a the dry solids are introduced into a suitable packaging unit 14 where they are packaged as a dry nutrient immediately usable and salable as a dry feed having a relatively high fat and protein content and a relatively low ash content. The material is taken from the drier 13a in a dry cake form and, if desired, the cakes may be crushed or broken prior to packaging.

It is also desirable to recover as much of the flour mill waste water as is economically feasible, since if such water can be recycled or reused in further grain washing operations it will materially reduce the water costs of the flour mill. Normally such water as forms a part of the flour mill wastes is lost, in that the recovery thereof has not been practicable. I have found that in the thickener 10 where the waste solids are concentrated, the water separated therefrom and withdrawn or otherwise expelled from the thickener is in a state of low contamination. This low contaminant water effluent may be readily filtered in a filter 15. The filter 15 removes substantially all of the contaminant from the water effluent and the remaining water may be recirculated and used in a further wheat washing operation. The filter 15 may be of any suitable type and may be either a pressure filter or an open type filter such as sand and rock. The filter 15 is simply representative of a number of devices that may be employed for removing the contaminant from the water effluent.

It is apparent that the apparatus described is conventional and that the particular apparatus employed may be varied considerably and may be chosen to meet the economic needs and other needs of any particular installation.

Specific examples of the process may be set out as follows:

*Example I*

Flour mill wastes consisting of water and 2,000 pounds of solids were introduced, about 10 hours after their formation, into a clarifier where they remained for about 15 minutes to allow thickening. After thickening, the wastes were passed by a sludge pump to an Eimco vacuum filter and the water content reduced to 63.5%. The thickened and partially dry material was then passed to a steam heated rotary type drier and the moisture content further reduced to 13.5%. When taken from the drier, the material was a dry cake and was then packaged. The temperature in the drier was maintained at 180° F. throughout the drying process.

*Example II*

Flour mill wastes consisting of water and 2,000 pounds of solids were introduced, 16 hours after their formation, into a clarifier and the material permitted to thicken for about 20 minutes. After thickening, the wastes were passed by a sludge pump to an Eimco vacuum filter and the water content reduced to about 68%. The resulting partially dried product was then introduced into a steam heated rotary type drier and the moisture content was further reduced to 14%. The dry material taken from the drier was in the form of a dried cake and was then packaged. The drier was maintained at a temperature of 170° F. throughout the drying operation.

*Example III*

The process was carried out exactly as in Example I, except that the flour mill wastes were introduced into the clarifier 4 hours after their formation.

*Example IV*

Flour mill wastes consisting of water and approximately 2,000 pounds of solids were introduced, about 10 hours after their formation, into a clarifier where they remained for about 15 minutes to allow the solids to thicken. After the solids had thickened, the wastes were passed by a sludge pump to an Eimco vacuum filter and the water content reduced there to approximately 63.5%. The thickened and partially dried material was then passed into a mixer and approximately 880 pounds of mill run wheat were added to the mixer. The mixed mill run wheat and waste solids were withdrawn from the mixer and then packaged. The moisture content of the mixed waste solids and mill run wheat was 14% when packaged.

Example V

The process was carried out as in Example IV above and the water effluent withdrawn from the clarifier, after the flour mill wastes had been in the clarifier about 15 minutes, was passed through an open filter consisting of sand and rock. The contaminant was removed from the water effluent in the filter and the water discharged from the filter had a purity of about 90%. The filtered water was then again used in further wheat washing operations.

In all of the above examples, the dry nutrient obtained had a relatively high fat and protein content while the ash content of the product was attractively low. The results were considered excellent and the dried product was immedately salable and usable as an animal feed. The thickening action in the clarifier occurred rapidly and quite effectively while there was negligible gelatin formation to impede the clarifying process and clog the filters, pumps, etc.

While in the foregoing specification I have set out in considerable detail examples of my process and apparatus for carrying out the same for purposes of illustration, it is apparent that changes in the details may be made by those skilled in the art without departing from the spirit of my invention.

I claim:

1. In a process for treating flour mill wastes which consist substantially of wheat solids and wash water to recover both the wash water and a relatively dry nutrient from the solids, the steps of thickening said wastes within at least about sixteen hours after their formation to concentrate the solids and produce also a relatively low contaminant water effluent, filtering said effluent to recover a reusable wash water and filtering the concentrated solids to reduce further the moisture content thereof both within about 20 minutes following the initiation of the thickening thereof, and drying the solids to produce a relatively dry feed nutrient.

2. The process of claim 1 in which the solids are dried to reduce the water content thereof to a range of about 12% to 18%.

3. The process of claim 2 in which the solids are dried in a heated drier in preparation for packaging.

4. The process of claim 2 in which the solids are dried by mixing the same with a dry nutrient in preparation for packaging.

5. In a process for recovering wash water from flour mill wastes, the steps of introducing the wastes comprising raw grain solids and water into a concentrator within about sixteen hours after their formation, permitting the waste solids to thicken within said concentrator to produce a relatively low contaminant water effluent, withdrawing the water effluent within about twenty minutes following the introduction of the flour mill wastes into said concentrator, and then filtering the effluent to remove substantially all of the contaminant therefrom, whereby the filtered water is reusable directly in further washing operations.

References Cited in the file of this patent

UNITED STATES PATENTS

| | | |
|---|---|---|
| 345,703 | Lafferty | July 20, 1886 |
| 1,157,935 | Gray | Oct. 26, 1915 |
| 2,070,286 | Lissauer et al. | Feb. 9, 1937 |
| 2,090,187 | Credo | Aug. 17, 1937 |

OTHER REFERENCES

Lockwood: Flour Milling, p. 187 (1949), Northern Pub. Co. Ltd., N. Y. C.